United States Patent
Howes et al.

(10) Patent No.: US 8,453,677 B2
(45) Date of Patent: Jun. 4, 2013

(54) VALVE

(75) Inventors: Jonathan Sebastian Howes, Cambridge (GB); James Macnaghten, Cambridge (GB)

(73) Assignee: Isentropic Limited, Cambridge (GB)

(*) Notice: Subject to any disclaimer, the term of this patent is extended or adjusted under 35 U.S.C. 154(b) by 261 days.

(21) Appl. No.: 12/747,475

(22) PCT Filed: Dec. 11, 2008

(86) PCT No.: PCT/GB2008/004092
§ 371 (c)(1),
(2), (4) Date: Aug. 24, 2010

(87) PCT Pub. No.: WO2009/074803
PCT Pub. Date: Jun. 18, 2009

(65) Prior Publication Data
US 2010/0308250 A1    Dec. 9, 2010

(30) Foreign Application Priority Data

Dec. 11, 2007 (GB) .................................. 0724158.1
Feb. 29, 2008 (GB) .................................. 0803794.7
Feb. 29, 2008 (GB) .................................. 0803795.4
Jul. 24, 2008 (GB) .................................. 0813571.7

(51) Int. Cl.
*F16K 47/08* (2006.01)
*F16K 3/32* (2006.01)
*F16K 25/00* (2006.01)

(52) U.S. Cl.
USPC .................... 137/625.3; 137/625.33; 251/175; 251/206

(58) Field of Classification Search
USPC ................ 251/89, 175, 206, 326; 137/625.3, 137/625.33
See application file for complete search history.

(56) References Cited

U.S. PATENT DOCUMENTS 1,343,576 A    6/1920 Neilson
2,858,851 A    11/1958 Holl
(Continued)

FOREIGN PATENT DOCUMENTS

CN    101046257    10/2007
DE    10 052 195    3/1959
(Continued)

OTHER PUBLICATIONS

International Search Report and Written Opinion from corresponding International application No. PCT/GB2008/004087, 10 sheets, mailed Apr. 23, 2009.

(Continued)

*Primary Examiner* — Eric Keasel
*Assistant Examiner* — Kevin Barss
(74) *Attorney, Agent, or Firm* — Lempia Summerfield Katz LLC

(57) ABSTRACT

A valve (50) comprising a first part (401) defining a first array of apertures and a second part (2) defining a second array of apertures, the first part (401) being moveable laterally relative to the second part (2) between a closed configuration in which the first and second arrays of apertures are not registered to substantially prevent passage of a fluid through the valve and an open configuration in which the first and second arrays of apertures are registered to allow passage of fluid, wherein the first and second parts (401, 2) are configured to lock in the closed configuration in response to a pressure differential across the valve (50). In one embodiment, the first part (401) is configured to be sealed against the second part (2) by a pressure differential across the valve when the first and second parts (401,2) are locked in the closed configuration.

16 Claims, 8 Drawing Sheets

U.S. PATENT DOCUMENTS

| | | | |
|---|---|---|---|
| 3,635,252 A | 1/1972 | Botnick | |
| 3,642,385 A | 2/1972 | McMahon | |
| 3,645,398 A | 2/1972 | Fiocco | |
| 4,415,139 A | 11/1983 | Potts | |
| 4,516,606 A * | 5/1985 | Worley | 137/625.3 |
| 4,718,455 A | 1/1988 | Dussourd et al. | |
| 5,054,522 A | 10/1991 | Kowanz et al. | |
| 5,427,146 A * | 6/1995 | Bakken et al. | 137/625.3 |
| 5,837,394 A | 11/1998 | Schumm, Jr. | |
| 6,561,483 B2 | 5/2003 | Nakagawa | |
| 6,666,978 B2 | 12/2003 | Steinel | |
| 6,701,876 B2 * | 3/2004 | Youqing | 123/90.11 |
| 6,877,964 B2 | 4/2005 | Burns et al. | |
| 7,051,964 B2 | 5/2006 | Van Der Zanden et al. | |
| 7,059,299 B2 * | 6/2006 | Clark | 123/337 |
| 2003/0165391 A1 | 9/2003 | Kim | |
| 2006/0033061 A1 | 2/2006 | van Mast et al. | |
| 2010/0186720 A1 | 7/2010 | Rochier | |

FOREIGN PATENT DOCUMENTS

| | | |
|---|---|---|
| DE | 1 221 867 | 7/1966 |
| DE | 10 2008 000735 | 6/2009 |
| DE | 10 2009 026 554 | 12/2010 |
| EP | 0 514 838 | 11/1992 |
| EP | 0 860 607 | 8/1998 |
| EP | 0 943 850 | 9/1999 |
| EP | 1 098 085 | 5/2001 |
| EP | 1 715 226 | 10/2006 |
| GB | 4659 | 0/1909 |
| GB | 27218 | 0/1912 |
| GB | 213573 | 6/1925 |
| GB | 599 211 | 3/1948 |
| GB | 1 026 855 | 4/1966 |
| GB | 1 181 228 | 2/1970 |
| GB | 1 241 022 | 7/1971 |
| GB | 1 354 486 | 5/1974 |
| GB | 1 456 601 | 11/1976 |
| GB | 1 504 281 | 3/1978 |
| GB | 2 169 990 | 7/1986 |
| GB | 2 442 597 | 4/2008 |
| GB | 2461989 | 1/2010 |
| JP | 11248012 | 9/1999 |
| JP | 2002 130492 | 5/2002 |
| JP | 2002 188734 | 7/2002 |
| JP | 2005 106286 | 4/2005 |
| JP | 2010 031979 | 2/2010 |
| WO | WO 99/57424 | 11/1999 |
| WO | WO 2004/090304 | 10/2004 |
| WO | WO 2006/100486 | 9/2006 |
| WO | WO 2007/145712 | 12/2007 |
| WO | WO 2009/070824 | 6/2009 |

OTHER PUBLICATIONS

International Search Report and Written Opinion from corresponding International application No. PCT/GB2008/004092, 13 sheets, mailed Apr. 23, 2009.

U.K. Search Report from U.K. patent application No. GB0813571.7, 3 sheets, dated Aug. 26, 2008.

U.K. Search Report from U.K. patent application No. GB0803795.4, 4 sheets, dated Aug. 26, 2008.

* cited by examiner

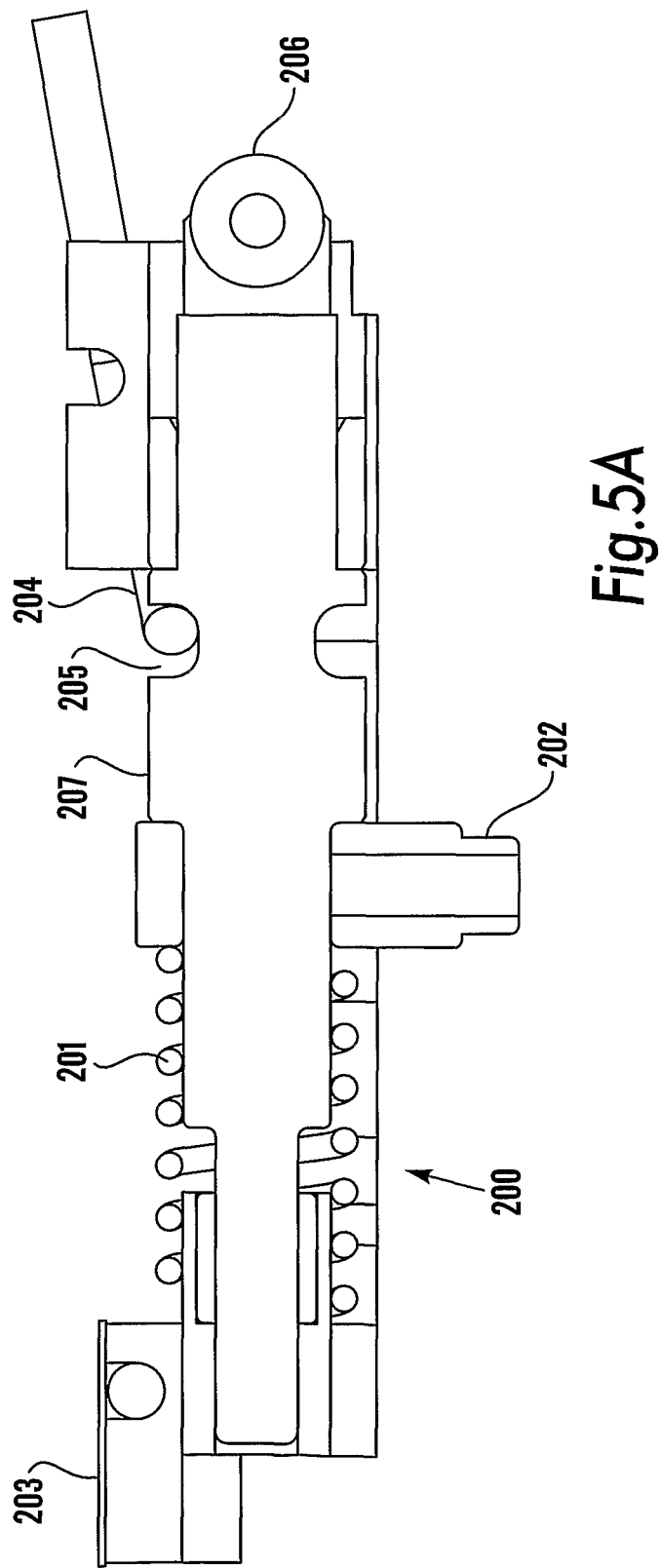

VALVE

RELATED APPLICATION DATA

This U.S. national phase application is based on international application no. PCT/GB2008/004092, which was filed on Dec. 11, 2008, which claimed priority to British national patent application no. 0724158.1, which was filed on Dec. 11, 2007, British national patent application no. 0803795.4, which was filed on Feb. 29, 2008, British national patent application no. 0803794.7, which was filed on Feb. 29, 2008, and British national patent application no. 0813571.7, which was filed on Jul. 24, 2008. Priority benefit of these earlier filed applications is hereby claimed.

The present invention relates generally to valves for controlling flow of gases and/or liquids between two discrete spaces. In particular, the present invention relates to valves for use in applications in which the pressure in each of the discrete spaces can vary such that at some stage there is no pressure difference between the spaces and at other stages there is a pressure difference. One application of such valves is in the compression and/or expansion of gases. However, the valve of the present invention may be suitable for use in any application that needs a high efficiency, large valve area, fast valve response and low pressure losses. This covers, but is not limited to, engines, vacuum pumps, compressors, expanders, other pumps, ducts and pipeflow situations.

In accordance with the present invention there is provided a valve comprising a first part defining a first aperture and a second part defining a second aperture, the first part being moveable relative to the second part between a closed configuration in which the first and second apertures are not registered to substantially prevent passage of a fluid through the valve and an open configuration in which the first and second apertures are registered to allow passage of fluid.

In one embodiment, the first and second parts are configured to lock in the closed configuration in response to a pressure differential across the valve. In this way, the first and second parts may be biased to move from the closed configuration to the open configuration automatically once the pressure difference across the valve reduces below a predetermined level. In one embodiment, the first part may additionally be configured to be sealed against the second part by a pressure differential across the valve when the first and second parts are locked in the closed configuration. In this way, the pressure differential may be used to both prevent relative movement between the first and second parts, when in the closed position and to provide the sealing force.

The first and second parts may be configured to unlock in the closed configuration when the pressure differential across the valve drops below a predetermined level. For example, the first and second parts may be configured to unlock in the closed configuration when the pressure differential across the valve approaches substantially zero. Such a valve will automatically release from the locked, sealed configuration when the pressure differential across the valve drops to substantially zero. Wear is kept to a minimum as the valve only moves when it is unloaded or lightly loaded and there is no or very little pressure difference between the two spaces. This means the valve may be unlubricated if required.

At least one of the first and second parts may be substantially plate-like. The first and second parts may be relatively lightweight. In this way, a valve may be provided in which a lightweight valve member is locked in place by even a small pressure differential across the valve and may be used to provide fast valve movements for a small energy input.

The first part may be moveable laterally relative to the second part such that in the closed configuration the first and second apertures are not registered and in the open configuration the first and second apertures are registered. In this way the first part is held out of the flow path of the gas when the first and second parts are in the open configuration and thus any tendency to flutter is avoided and the air has an unrestricted path through the valve.

The first part may be configured to move linearly relative to the second part (i.e. to form a linear slide valve) or may be configured to rotate relative to the second part (i.e. to form a rotary slide valve). The first part may be supported by the sealing face of the second part during movement between the open and closed configurations. Advantageously, the sliding motion of the first part relative to the second part will tend to act as a self-cleaning mechanism. The first part may be configured to move parallel to the surface of the sealing face. The surface of the sealing face may be a plane, a single curvature surface (e.g. cylindrical surface), or a surface of rotation.

In one embodiment, the first part may be constrained to move substantially along the surface of the sealing face of the second part.

The first and second parts may be configured to lock in the closed configuration in the presence of a pressure differential across the valve by means of limiting friction between the first and second parts. In situations where it is not possible to rely on limiting friction, locking means may still be provided by the pressure differential to maintain the first and second parts in the closed configuration. The locking means may comprise a positive pressure actuated locking mechanism (e.g. a latch mechanism) or a static pressure actuated geometric constraint (e.g. retraining protuberance or stud) for providing additional resistance against lateral movement between the first and second parts.

The valve may comprise opening means for moving the first part from the closed configuration to the open configuration and closing means for moving the first part from the open configuration to the closed configuration. The opening means and closing means may be two discrete mechanisms or may comprise a single mechanism (e.g. single pneumatic actuator).

In one embodiment the opening means may comprise opening biasing means configured to apply a biasing action when the first part is in the closed configuration and the valve further comprises trigger means for selectively engaging the closing means when the first part is in the open configuration. In this way, the opening means will act to apply a biasing force to the valve while pressure is still locking the valve in place, whereby the valve will open at or near pressure equalisation as the biasing force overcomes exceeds the locking force (e.g. frictional force) produced by the pressure differential.

The closing means may comprise closure force producer means (e.g. closing biasing means) configured to overcome the opening means. The pressure difference across the valve is related to the strength of the opening force producer and the sealing area of the valve but has no relation to the strength of the closing force producer. Operation of the trigger means may be independent of the pressure across the valve. In this way, the closure or trigger timing can be varied to allow for different valve closing positions.

In one embodiment, the closure force producer means comprises a pre-loaded force producer, such that the closure event is fast relative to the time taken to pre-load the force producer. In another embodiment, one of the first and second parts may comprise locating slots to receive one or more closure pins to locate and additionally reset the closing means. Similarly, one of the first part and the second part may comprise one or more locating holes to allow one or more opening pins to locate.

The closure location may be controlled by one or more accurately located pins in combination with the closure force producer, with the flexible plate-like member being held in tension therebetween. In another embodiment, the lateral position of the first part relative to the second part when in the opening configuration may be controlled by one or more accurate location pins in combination with the opening biasing means, with the plate being held in tension therebetween.

The valve may further comprise reset means for selectively disengaging the closing means when the first part is locked in the closed configuration by a pressure differential. The closure of the valve may be actuated mechanically at selectable varying points in the cycle.

The opening means may comprise opening housing means, opening pin means and opening spring means. The closing means may comprise closing housing means, closing pin means, trigger means and closing spring means. The closing spring means may be stronger than the opening spring means. In the case that the opening means and closing means are provided by a single mechanism, the opening pin means and the closing pin means may comprise a single pin.

The first part may be configured to move from the open configuration to the closed configuration when the trigger means is activated and the closing spring means moves (via the closing pin means) the first part to the closed configuration. As the first part moves towards the closed configuration, the opening pin means and opening spring means may be configured to move at the same time since the closing spring means is stronger than the opening spring means.

The closing means may be configured to be mechanically reset and the trigger means locked into place before the opening means is engaged. The opening means may be configured to bias the first part in the open configuration via the opening spring means and the opening pin means. In this way, when the pressure either side of the valve plate is equal or near equal the first part will move automatically from the closed configuration to the open configuration.

The strength of the biasing action provided by the opening biasing means may be variable. In this way, the opening force can be varied to allow for different valve opening speeds and times. For example, the opening force may be varied to allow faster running by making the valve open earlier. In one embodiment, the strength of the biasing action provided by the opening biasing means may be variable in dependence upon the peak cycle pressure differential across the valve.

The opening force provided by the opening means may be substantially non-linear. For example, the biasing action provided by the opening biasing means may be substantially non-linear. In one embodiment, the energy expended by the opening means may be at least partially recoverable. For example, the opening energy may be recovered or at least partially recovered by use of springs or magnets.

In one embodiment, the opening device may selectively engageable. For example, the opening means may comprise sensor means for determining when the pressure differential across the valve falls below a predetermined level and activates opening force producer means.

The strength of the closing action (e.g. biasing action) provided by the closing means may be variable. In this way, the closing force can be varied to allow for different valve closing speeds and times.

Upon activation, the closing means may be configured to provide a closing force until the first part is in the closed configuration.

In one embodiment, the closure energy is recovered or at least partially recovered. For example, the closure energy may be recovered or at least partially recovered by springs or magnets.

Since a closure event will normally require a positive location of the first part relative to the second part, it is preferable that some of the closure force remains at closure to ensure this positive location.

The closure force produced by the closing means may be substantially larger than the opening force produced by the opening means. In this way, a closing event will always result in closure.

In one embodiment, the first and second parts comprise interengageable parts for controlling relative movement (e.g. oscillating movement) between the first and second parts. In one embodiment the interengageable parts comprise one or more location pins and a corresponding one or more slots for receiving the one or more location pins. In this way, relative movement between the first and second parts may be restricted to move in path defined by the slot thereby controlling both the direction and distance of relative movement between the first and second parts.

In one embodiment movement of the first part relative to the second part is constrained by two or more accurately located and sized location pins such that the first part can only move backwards and forwards relative to the second part in a single straight line or single arc and movement in any other direction is minimised. Advantageously, the use of such an arrangement allows the movement between the first and second parts to be accurately controlled without having to provide a precise actuating mechanism. In one embodiment, one of the first and second parts may further comprise a stop pin for abutting a guide pin on the other part when the first and second parts have attained the open or closed configuration.

If the plate-like member is pushed from a point located behind the centre of gravity, then precise guides may be necessary to keep the plate-like member in line.

In one embodiment, the first part comprises a first array of apertures and the second part comprise a second array of apertures. The first part is moveable laterally relative to the second part such that in the first configuration the first and second arrays of apertures are not registered and in the second configuration the first and second arrays of apertures are registered.

Embodiments of the present invention will now be described by way of example with reference to the accompanying drawings in which:

FIG. 3b is a schematic cross-sectional views of the valve mechanism of the piston shown in FIG. 3a;

FIGS. 4a and 4b are schematic illustrations of an opening means of the valve means of the piston of FIG. 3a; and FIGS. 5a and 5b are schematic illustrations of a closing means of the valve means of the piston of FIG. 3a.

Figure 1A:
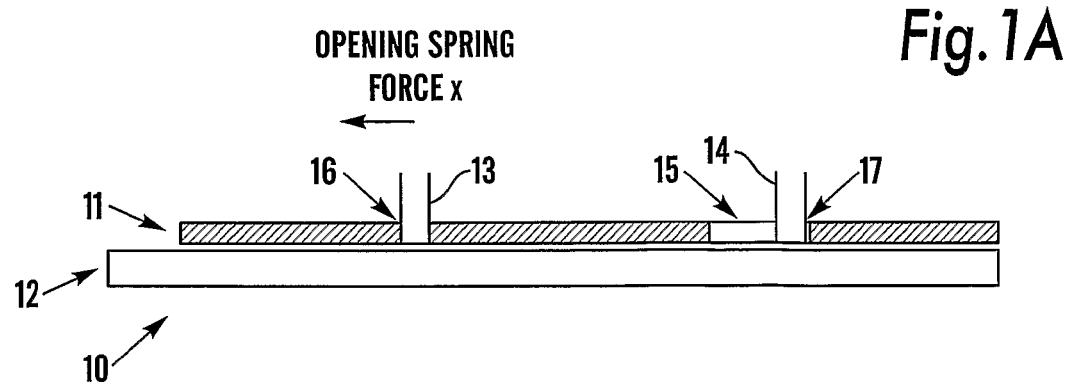
FIGS. 1a, 1b and 1c are schematic cross-sectional views of a first valve mechanism according to the present invention.
Figure 1B:
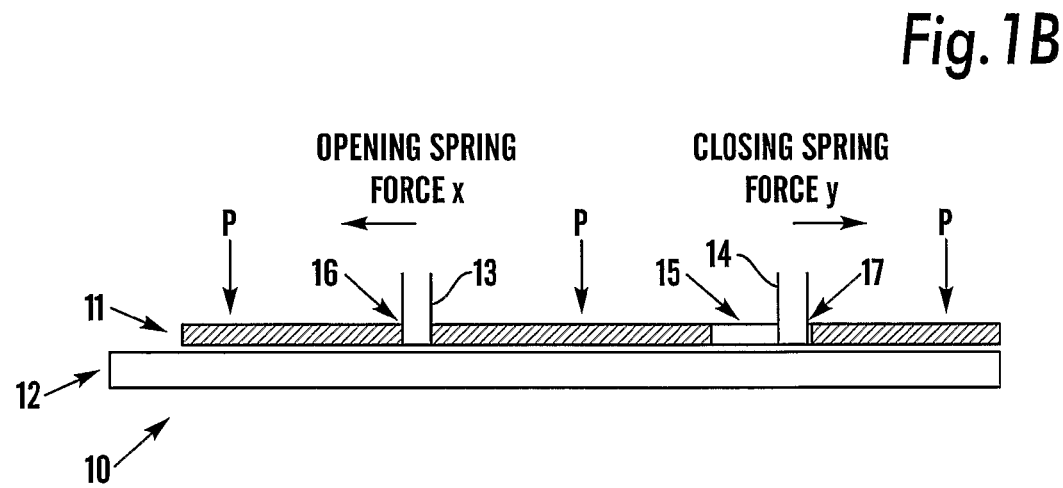
Figure 1C:
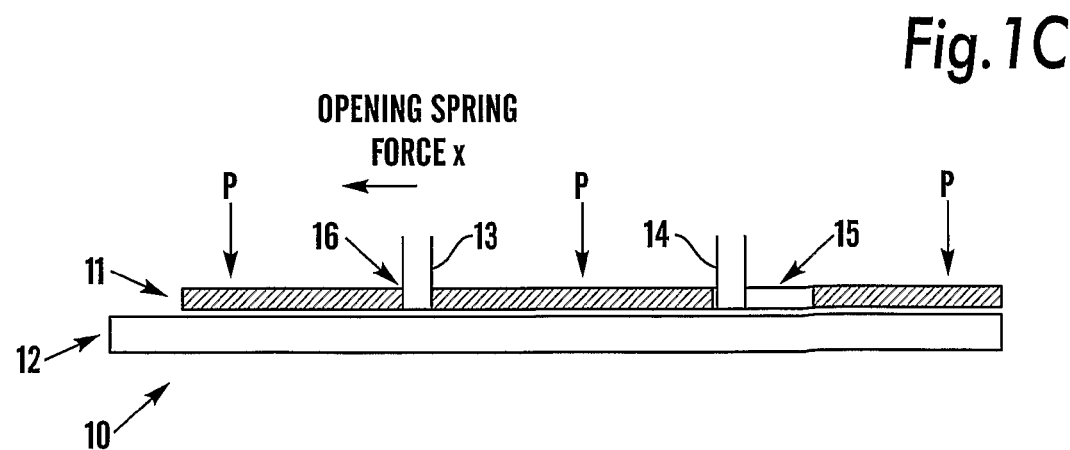

FIGS. 1a-1c

FIGS. 1a-1c show a valve means 10 comprising valve plate means 11, valve sealing face means 12, opening pin means 13, closing pin means 14 and closing slot means 15. The valve means 10 may be opened or closed by moving the valve plate means 11 relative to the valve sealing face means 12 between an open position in which corresponding apertures (not shown) in the valve plate means 11 and valve sealing face 12 are registered to allow passage of fluid through the valve means 10 and a closed position in which the corresponding apertures in the valve plate means 11 and valve sealing face 12 are wholly offset to prevent passage of fluid through the valve means 10.

In FIG. 1*a* the valve means 10 is shown with the valve plate means 11 in the open position. In order to attain the open position, the valve plate means 11 is moved from the closed position to the open position by the opening pin means 13, such that the apertures (not shown) in the valve plate means 11 are lined up with the apertures (not shown) in the valve sealing face means 12.

The opening pin means 13 applies a force x (e.g. as a result of a biasing force applied by a spring) to the plate at contact point means 16 in order to move the valve means 11 to the first position on or near pressure equalisation. The valve plate means 11 is stopped either close to or touching the closing pin means 14 at the contact point means 17 in the closing slot means 15.

In this configuration the location of the valve plate means 11 is controlled purely by the opening pin means 13 and the closing pin means 14. FIG. 1*b* shows valve plate means 11 in the closed position such that the apertures in the valve sealing face means 12 are sealed shut by the valve plate means 11.

In order to move the valve plate means 11 from the open to the closed position, the closing pin means 14 has applied a force y to the valve plate means 11 at contact point means 17 in order to overcome the resisting force x of the opening pin means 13 applied at contact point 16. Since force y is greater than force x, the plate moves to the closed position.

In the closed configuration a pressure differential P is applied across the valve means 10 and locks the valve plate means 11 against the valve sealing face means 12. This pressure force P, in normal operation, is of a substantially greater magnitude than forces x and y.

FIG. 1*c* shows valve plate means 11 locked against the valve sealing face means 12 by the pressure force P in the closed position after the locking mechanism is reset.

In order to reset the locking mechanism, the closing pin means 14 has been re-loaded and moved in the closing slot means 15 such that it is not touching the end of the closing slot means 15 and is not applying a force to the valve plate means 11. The opening spring 13 is applying a force x to the valve plate means 11 via the contact point means 16. When the pressure differential is at or near pressure equalisation the opening pin means 13 will now be able to move the valve means 10 back to the open position.

With a large valve area, a small pressure differences will create large forces on valve plate means 11 to lock it in place and which may also be used to provide the sealing pressure. The aperture density may vary from a single aperture up to any number of apertures as required. A small aperture results in a shorter stroke offering faster actuation. It also results in greater pressure carrying ability for a given plate material and thickness. By this means smaller apertures allow for both faster actuation and lower plate mass. Because the force required to open the lightweight plate is very small in relation to the sealing force, it will only move the plate when the pressure difference across the valve is very small or non-existent, which occurs at or near pressure equalisation, then the valve will move from its closed position to its open position providing no other forces are involved.

If the initial opening force of the opening device is increased then the pressure difference at which the valve plate means 11 will release will also increase, but may still be kept low relative to cycle pressures. However, a larger force will also normally ensure a faster valve opening time, which can be beneficial in many applications.

This initial opening force may be varied during operation by a variety of means to reduce its magnitude in low pressure and/or low speed applications and to increase its magnitude in high pressure and/or high speed operation. It may be useful for this initial opening force to be low on start-up as the pressures within the system may not have built sufficiently to ensure good pressure locking of valves.

The overall opening force profile can also be very varied in its shape. A short list of some of the combinations, which is not exhaustive, are that it can be near a constant force over the whole movement range, it can start large and finish low or it can be non linear such that it starts low, builds up and then reverses to recover some of the energy.

The opening device may constantly apply a force to the valve plate means 11 or it may only appear for specific parts of the cycle. There are many possible configurations, although the simplest one is to use a spring to apply a force to move the valve plate means 11 from the closed to the open position. The opening device may apply a substantially constant force.

The opening device force can be mechanical, hydraulic, pneumatic, magnetic, electrical or other suitable force generating means. The closure device force can be mechanical, hydraulic, pneumatic, magnetic, electrical or other suitable force generating means.

The closure device is activated at a specific point in the cycle and its function is to move the valve means 10 from the open to the closed position. The point when this happens in the cycle can be varied, but the principle is that the closure event happens at a controlled point. In addition the valve will only seal if the pressure difference is in a direction that will force the valve plate means 11 against the valve sealing face means 12. The valve means 10 is open at this stage in the cycle and it is important that this event is rapid relative to the cycle time. If the air flow through the valve means 10 is high at the closure point (for example this maximum normally occurs in a piston if the closure is at mid cycle) then it is possible for a pressure difference to build up and for the valve plate means 11 to lock in place before it is fully closed, which will result in significant performance problems.

The closure device needs to move the valve plate means 11 to the closed position, after which a pressure difference will lock the valve plate means in place and the closure force can be removed. For example, if the closure device is a mechanical triggered spring and the opening device a simple spring, then the closure device may be reset such that the opening device can open the valve plate means 11 when pressure equalisation occurs. This reset event can take place slowly relative to the actual valve closure time. The only criteria is that it must occur prior to the opening device needing to 'fire'. The closure time can be significantly faster than the reset and the time of closure is independent of any other variables, such as piston speed.

Closure can be driven by a cam or other device, but where possible a pre-loaded trigger is used to ensure that the closure is fast and accurate every time. If the closure were driven by piston position and a cam it would mean that valve events near top dead centre (TDC) or bottom dead centre (BDC) would be significantly slower or cam loads much higher to achieve a fast closure time.

In certain configurations there can be a trade off with this valve between pressure range and opening times. Generally the stronger the opening force the faster the opening time and the greater the pressure difference at which it will release. This pressure difference is still very small when compared to conventional valves, but it can be relevant if there is no pressure range at start up (both sides unpressurised) as the valves are locked by the pressure difference and if there is no difference they will not lock shut. Consequently if this is an issue then there are a number of means (e.g. mechanical, pneumatic, magnetic etc.) that can be used to link the opening force to the pressure range between the two spaces, which means that the opening force will increase as the pressure range between the two spaces increases, allowing correct operation and faster running.

FIGS. 2a-2d

FIGS. 2a-2d show valve means 110 comprising valve plate means 111, valve sealing face means 112, opening pin means 113, closing pin means 114, location pins 115 and 116, and slot means 117, 118 and 119. The valve means 110 may be opened or closed by moving the valve plate means 111 relative to the valve sealing face means 112 between an open position in which corresponding apertures (not shown) in the valve plate means 111 and valve sealing face 112 are registered to allow passage of fluid through the valve means 110 and a closed position in which the corresponding apertures in the valve plate means 111 and valve sealing face 112 are wholly offset to prevent passage of fluid through the valve means 110.

Figure 2A:
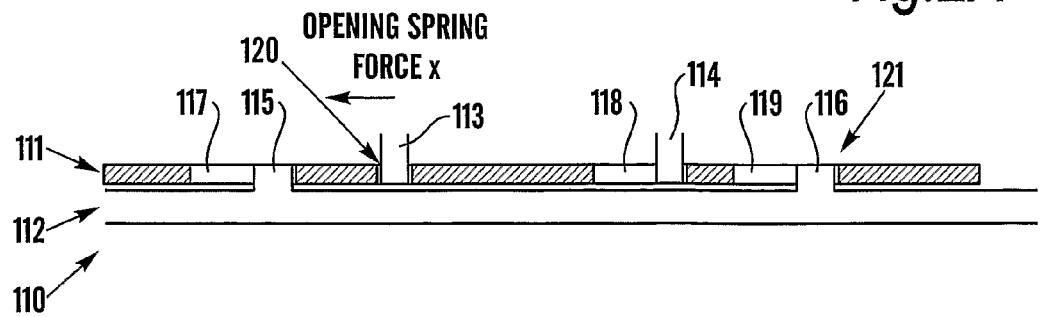
FIGS. 2a, 2b, 2c and 2d are schematic cross-sectional views of a second valve mechanism according to the present invention.

In FIG. 2a, the valve plate means 111 has been moved from the closed position to the open position by the opening pin means 113, such that the apertures in the valve plate means 111 are lined up with the corresponding apertures in the valve sealing face means 112.

The opening pin means 113 applied a force x to the plate at contact point means 120 in order to move the valve plate means 111 to the open position on or near pressure equalisation. The valve plate means 111 is stopped by the location pin 116 via the contact point means 121. Location pin means 115 and closing pin means 114 are preferably not in contact with the ends of the slot means 117 and 118. However it is preferable that the sides of the slot means 115 and 119 are in contact with location pins 115 and 116 as this will help to keep the plate in the correct alignment.

In this configuration the location of the valve plate means 111 is preferably controlled purely by valve plate means 111 being held in tension with the location pin means 116, where the location pin means 116 effectively provides the accurate stop position. As the valve is open there is no pressure differential across it.

Figure 2B:
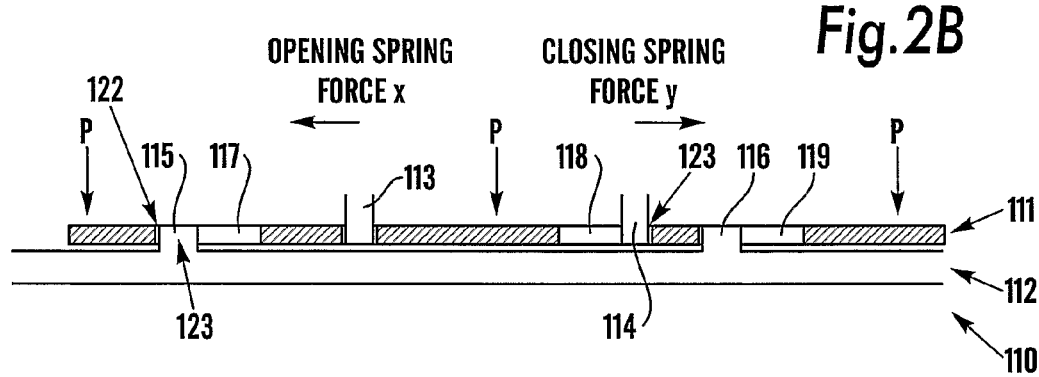

FIG. 2b shows valve plate means 111 in the closed position. The valve means 110 has been moved from the open position to the closed position by the closing pin means 114, such that the ports in the valve sealing face means 112 are sealed shut by the valve plate means 111.

The closing pin means 114 is activated by a trigger and applies a force y to the plate at contact point means 123 in order to overcome the resisting force x of the opening pin means 113. y is greater than x so the valve plate means ill moves until it comes into contact with location pin means 115 via contact point means 122.

In this configuration a pressure differential P is applied across the valve means 110 and locks the valve plate means 111 against the valve sealing face means 112. This pressure force P, in normal operation, is of a substantially greater magnitude than the opening force x and closing force y.

Location pin means 116 is preferably not in contact with the ends of the slot means 119. However it is preferable that the sides of the slot means 115 and 119 are in contact with location pins 115 and 116 as this will help to keep the plate in the correct alignment.

In this configuration the initial location of the valve plate means 111 is preferably controlled purely by valve plate means 111 being held in tension with the location pin means 115, where the location pin means 115 effectively provides the accurate stop position. However, once the pressure differential P is applied the valve plate means 111 will not move until the pressure drops at or near pressure equalisation.

Figure 2C:
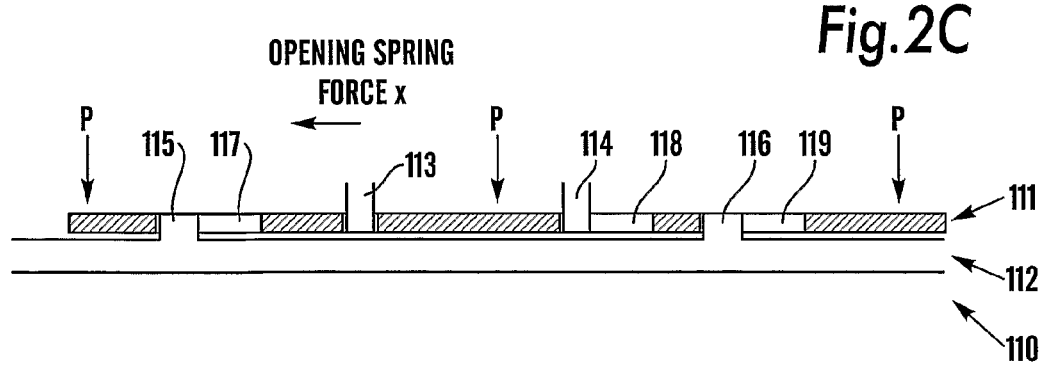

FIG. 2c shows valve plate means 111 locked against the valve sealing face means 112 by the pressure force P in the closed position after the locking mechanism is reset.

Because valve plate means 111 is locked in place by pressure it is possible to move the closure pin means 114 to the opposite end of slot means 118 such that it only has very light or preferably no contact with the end of slot means 118. In this location it is possible for the valve plate means 111 to move to the open position without actually touching the closing pin 114 with the end of slot means 118. In this way the closing mechanism has been effectively 'reset'. The valve plate means 111 cannot move because of the pressure differential P.

Figure 2D:
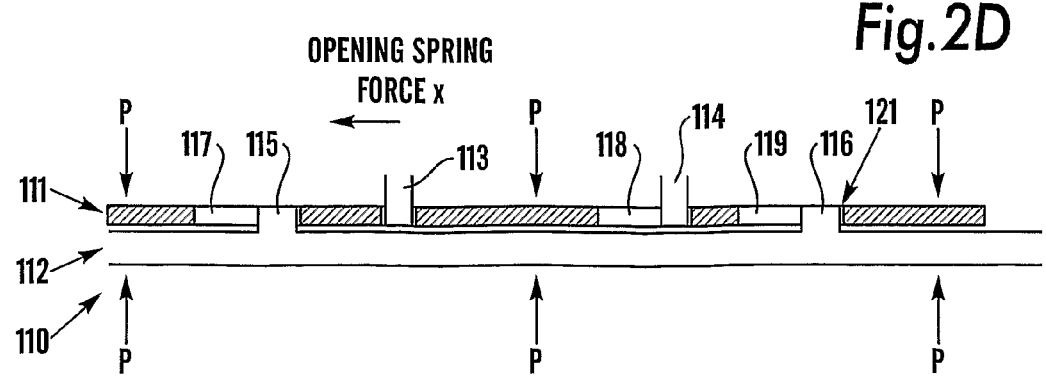

FIG. 2d shows that at or near pressure equalisation the valve plate 111 has now moved to the open position shown in FIG. 2a.

FIG. 3a

Figure 3A:
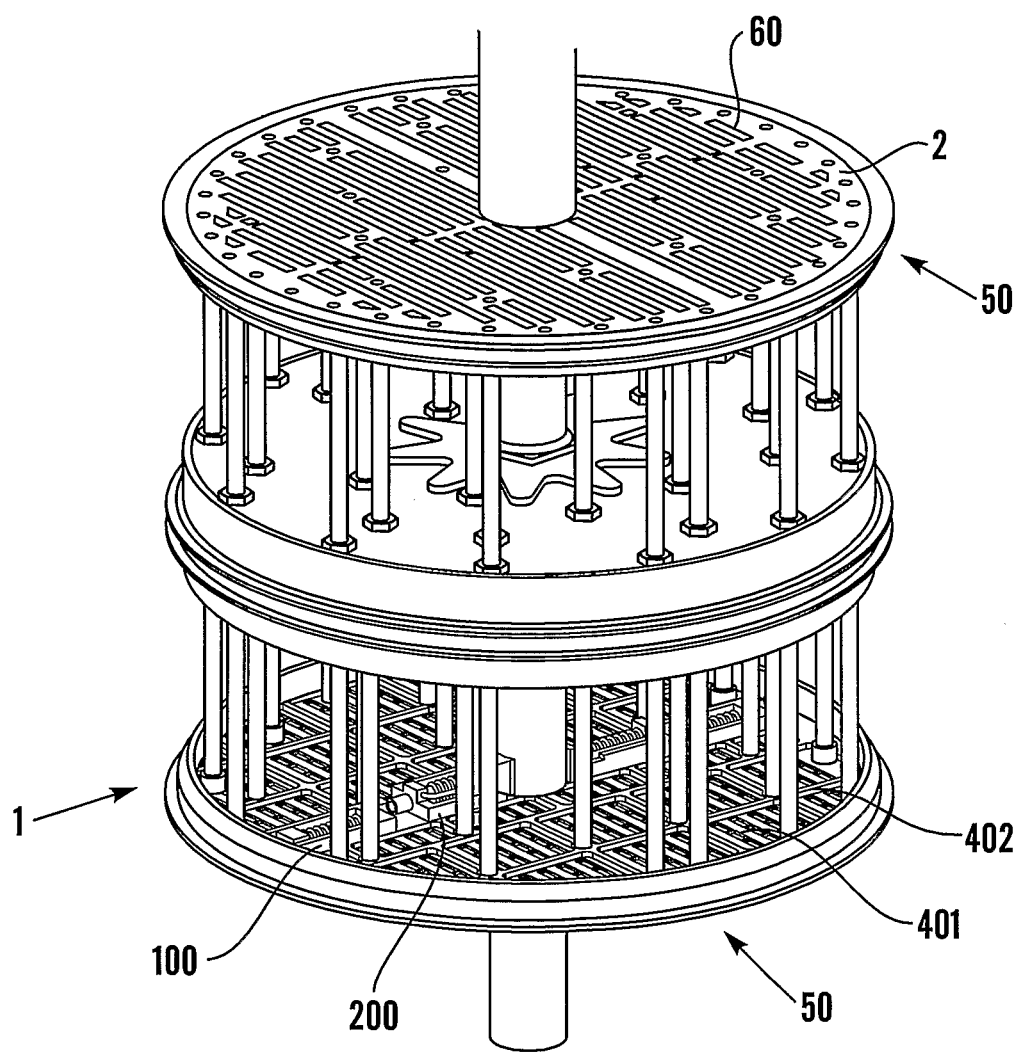
FIG. 3a is a schematic view of a double acting piston incorporating a valve mechanism according to the present invention.

FIG. 3a shows a schematic illustration of a double acting piston means 1 comprising valve means 50 including: piston face means 2 including multiple sealing ports 60; retaining plate means 402; valve plate means 401; opening means 100; and closing means 200.

FIG. 3b

Figure 3B:
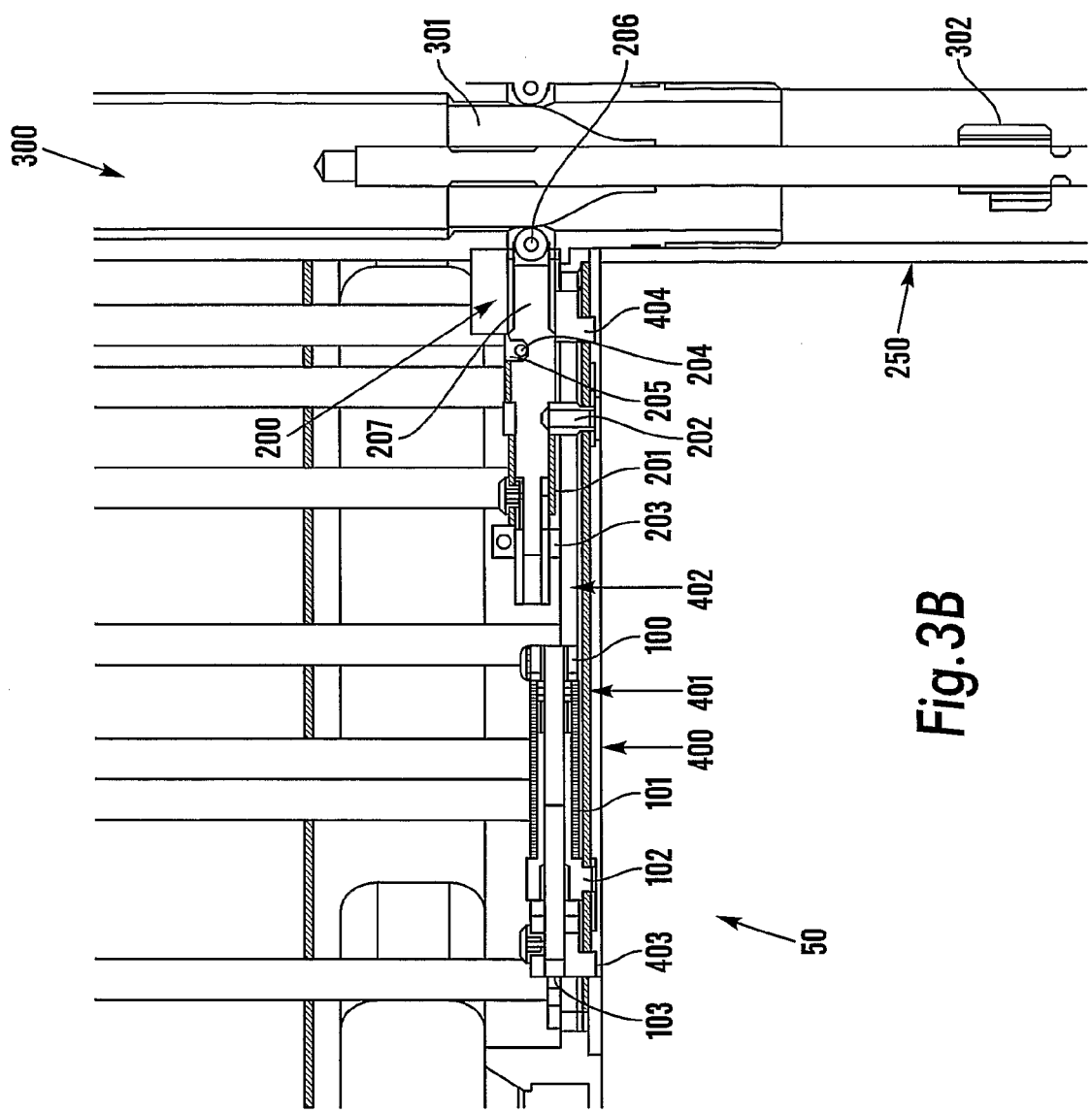

FIG. 3b shows a valve means 50 comprising opening means 100 comprising opening spring means 101, opening pin means 102 and opening housing means 103; a closing means 200 comprising closing spring means 201, closing housing means 203, trigger means 204 and closing shaft means 207 comprising closing pin means 202, trigger slot means 205 and reset roller 206; drive shaft means 250; stationary control rod means 300 comprising reset cam means 301 and trigger stop means 302; valve sealing face means 400; valve plate means 401; retaining plate means 402; location pin means 403, 404.

The valve sealing face means 400 and the retaining plate means 402 sandwich the valve plate means 401 between them such that the valve plate means 401 can slide freely in a direction parallel to the valve sealing face means 400 when there is no pressure differential across the valve.

The opening means 100 and the closing means 200 are both located on the retaining plate means 402. The opening pin means 102 and the closing pin means 202 pass through the valve plate means 401 into a slot in the valve sealing face means 400. The location pin means 403 and 404 locate in a recess in the valve sealing face means 400.

All of these items are attached to the drive shaft means, which can move up and down. There is a stationary control rod means 300 that is located inside the drive shaft means 250. On the control rod means 300 are located a reset cam means 301 and a trigger stop means 302. These items are all stationary and the drive shaft means 250 and attached structure move up and down past these parts.

When the opening pin means 102 is moved in the direction that compresses the opening spring means 101 then the opening spring means 101 provides a resisting force that can be used to open the plate valve means 401 via the opening pin means 102 when the pressure differential across the valve is at or near pressure equalisation.

When the reset roller means 206 runs along a reset cam means 301 it pushes the closing shaft means 207 into the closure housing means 203 such that the closure spring means 201 is compressed and the trigger means 204 drops into the trigger slot means 205. The reset roller means 206 moves past the reset cam means 301 and the closure spring means 201 pushes the closing shaft means 207 via the trigger slot means 205 against the trigger means 204. In this position the opening means can move a valve means from the second position to the first position at or near pressure equalisation.

When the trigger means 204 contacts a trigger stop means 302 it lifts the trigger means 204 out of the trigger slot means 205 and the closing spring means 201 moves the closing pin means 202 via the closing shaft means 207 such that a valve means attached to the closing pin means 202 will move from the first position to the second position.

The closing spring means 201 is stronger than the opening spring means 101 such that the movement of the valve means from the first position to the second position may also 'reload' the opening spring means by compressing it.

Figure 4A:
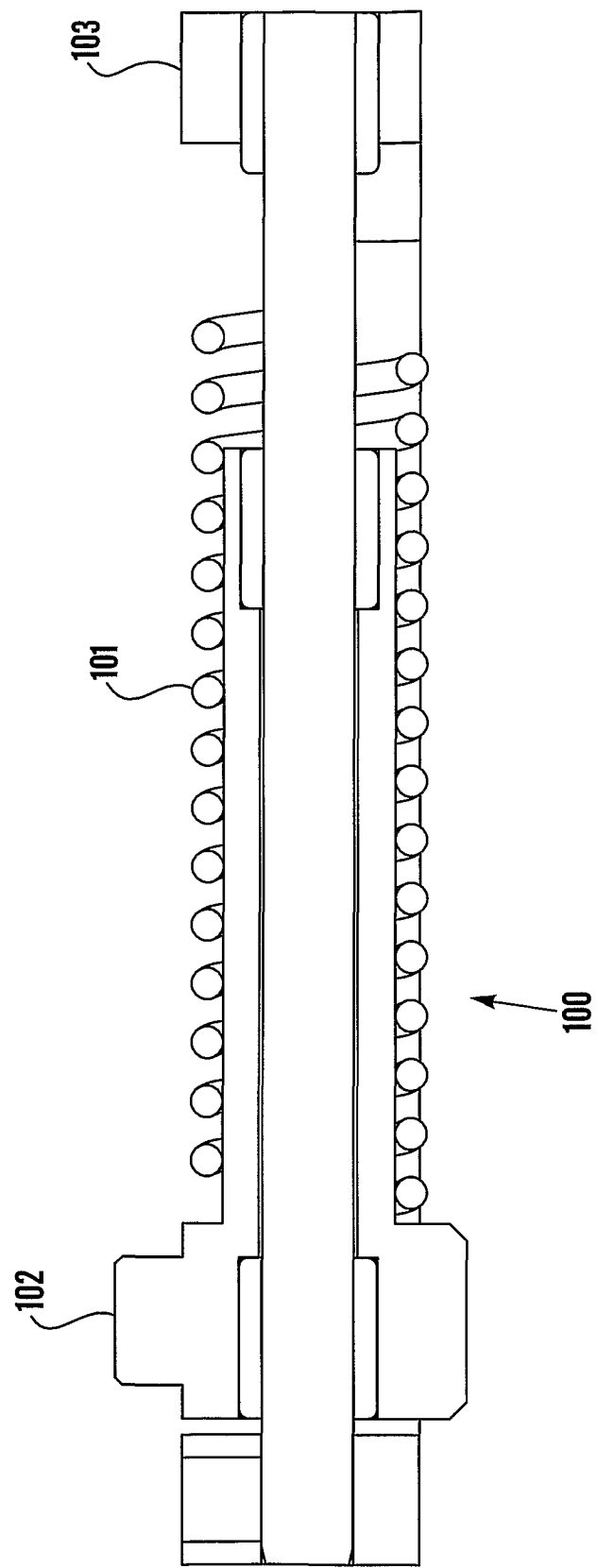
Figure 4B:
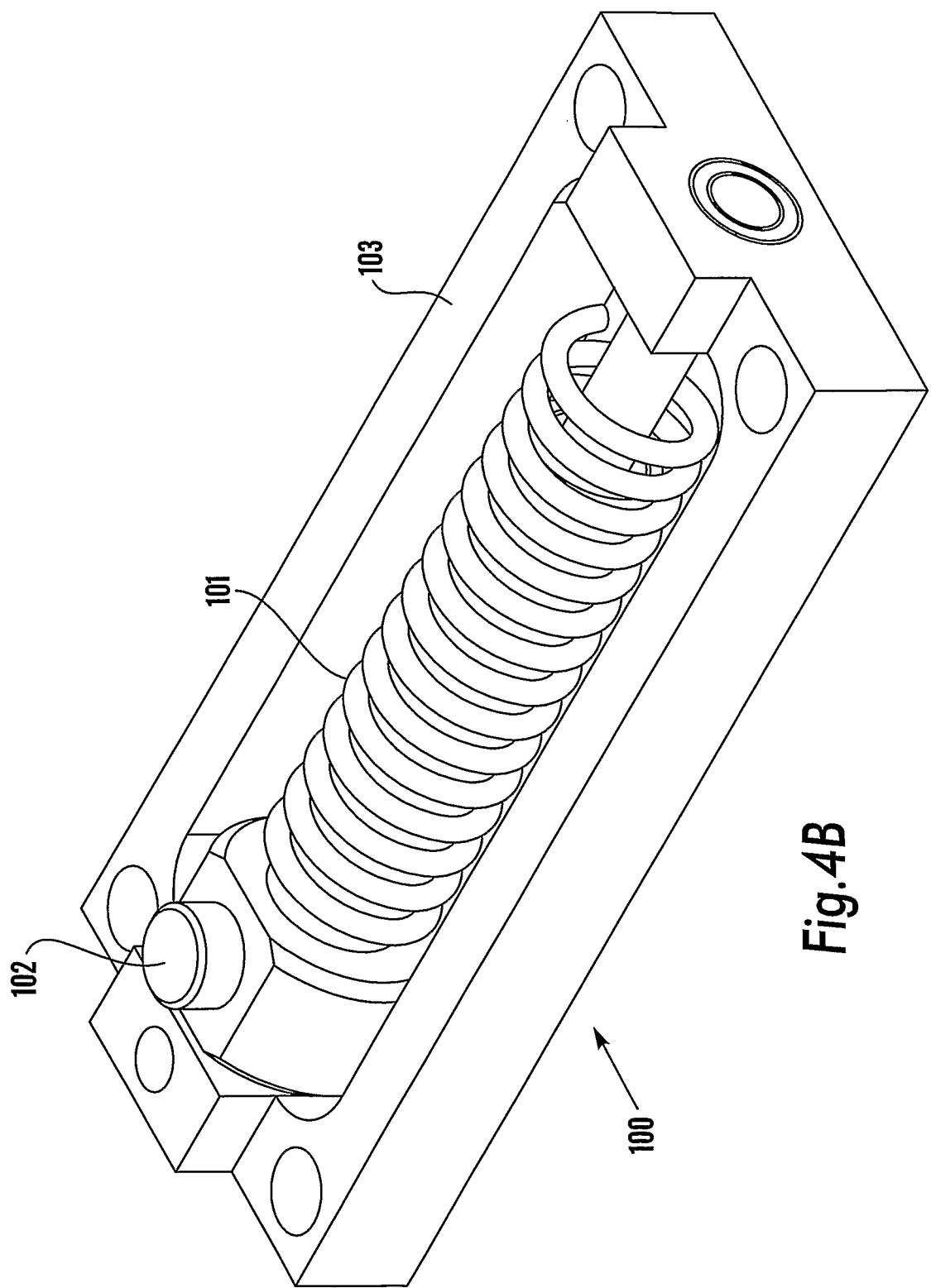

FIGS. 4a and 4b

FIGS. 4a and 4b show opening means 100 comprising opening spring means 101, opening pin means 102 and opening housing means 103.

When the opening spring pin means 102 is moved in the direction that compresses the opening spring means 101 then the opening spring means 101 provides a resisting force that can be used to open the valve means (not shown) via the opening pin means 102 when the pressure differential across the valve is at or near pressure equalisation.

Figure 5B:
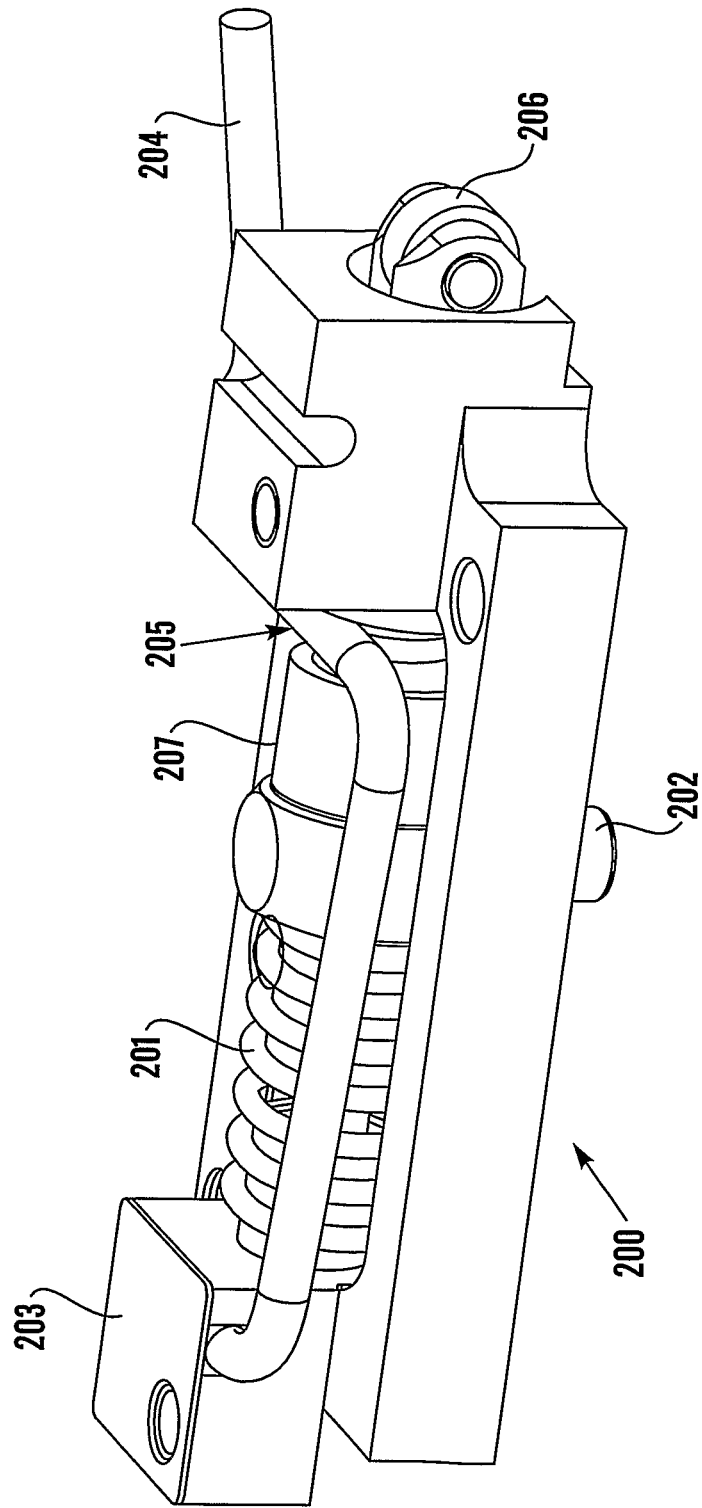

FIGS. 5a and 5b

FIGS. 5a and 5b show closing means 200 comprising closing spring means 201, closing housing means 203, trigger means 204 and closing shaft means 207 comprising closing pin means 202, trigger slot means 205 and reset roller 206.

When the reset roller means 206 runs along a reset cam means (not shown) it pushes the closing shaft means 207 into the closure housing means 203 such that the closure spring means 201 is compressed and the trigger means 204 drops into the trigger slot means 205. The reset roller means 206 moves past the reset cam means (not shown) and the closure spring means 201 pushes the closing shaft means 207 via the trigger slot means 205 against the trigger means 204. In this position the opening means can move a valve means from the second position to the first position at or near pressure equalisation.

When the trigger means 204 contacts a trigger stop means (not shown) it lifts the trigger means 204 out of the trigger slot means 205 and the closing spring means 201 moves the closing pin means 202 via the closing shaft means 207 such that a valve means attached to the closing pin means 202 will move from the first position to the second position.

The closing spring means 201 is stronger than the opening spring means (not shown) such that the movement of the valve means from the first position to the second position may also 'reload' the opening spring means by compressing it.

The invention claimed is:

1. A valve comprising:
a first part defining a first aperture and a second part defining a second aperture, the first part being moveable laterally relative to the second part between a closed configuration in which the first and second apertures are not registered to substantially prevent passage of a fluid through the valve and an open configuration in which the first and second apertures are registered to allow passage of fluid, the first and second parts being configured to lock in the closed configuration in response to a pressure differential across the valve and unlock in the closed configuration when the pressure differential across the valve is substantially zero;
an opening mechanism for moving the first part from the closed configuration to the open configuration;
a closing mechanism for moving the first part from the open configuration to the closed configuration; and
a trigger for selectively activating the closing mechanism when the first part is in the open configuration;
wherein the opening mechanism comprises an opening biasing mechanism configured to apply a biasing action when the first part is locked in the closed configuration, with the first and second parts being configured to lock in the closed configuration due to the pressure differential preventing relative lateral movement between the first and second parts whilst the biasing action is applied by the opening biasing mechanism, and wherein the first and second parts are biased to move from the closed configuration to the open configuration automatically once the pressure difference across the valve reduces below a predetermined level.

2. A valve according to claim 1, wherein the first part is configured to be sealed against the second part by a pressure differential across the valve when the first and second parts are locked in the closed configuration.

3. A valve according to claim 1, wherein one or more of the first and second parts are substantially plate-like.

4. A valve according to claim 1, wherein the closing mechanism comprises a closure force producer configured to overcome the opening biasing mechanism.

5. A valve according to claim 4, wherein the strength of the biasing action provided by the closure force producer is variable.

6. A valve according to claim 1, wherein the trigger is operable independently of pressure across the valve.

7. A valve according to claim 1, further comprising reset mechanism for selectively disengaging the closing mechanism when the first part is in the closed configuration.

8. A valve according to claim 1, wherein the first part is constrained to move substantially in a plane defined by a sealing face of the second part.

9. A valve according to claim 1, wherein the strength of the biasing action provided by the opening biasing mechanism is variable.

10. A valve according to claim 9, wherein the strength of the biasing action provided by the opening biasing mechanism is variable in dependence upon the pressure differential across the valve.

11. A valve according to claim 1, wherein the biasing action provided by the opening biasing mechanism is substantially non-linear.

12. A valve according to claim 11, wherein the energy expended by the opening biasing mechanism is at least partially recoverable.

13. A valve according to claim 1, wherein the opening device is selectively engageable.

14. A valve according to claim 1, wherein upon activation the closing mechanism is configured to provide a closing force until the first part is locked in the closed configuration.

15. A valve according to claim 1, wherein the first and second parts are configured to lock in the closed configuration in the presence of a pressure differential across the valve via limiting friction between the first and second parts.

16. A valve comprising:
   a first part defining a first aperture and a second part defining a second aperture, the first part being moveable laterally relative to the second part between a closed configuration in which the first and second apertures are not registered to substantially prevent passage of a fluid through the valve and an open configuration in which the first and second apertures are registered to allow passage of fluid, the first and second parts being configured to lock in the closed configuration in response to a pressure differential across the valve to prevent relative lateral movement between the first and second parts, and unlock in the closed configuration when the pressure differential across the valve is substantially zero;
   an opening mechanism for moving the first part from the closed configuration to the open configuration;
   a closing mechanism for moving the first part from the open configuration to the closed configuration; and
   a trigger for selectively activating the closing mechanism when the first part is in the open configuration;
   wherein the opening mechanism comprises an opening biasing mechanism configured to apply a biasing action when the first part is locked against lateral movement in the closed configuration, such that the biasing action is applied while pressure is locking the valve in place, whereby the valve will open at or near pressure equalisation as the biasing action overcomes the locking force produced by the pressure differential.

* * * * *